Patented Dec. 22, 1925.

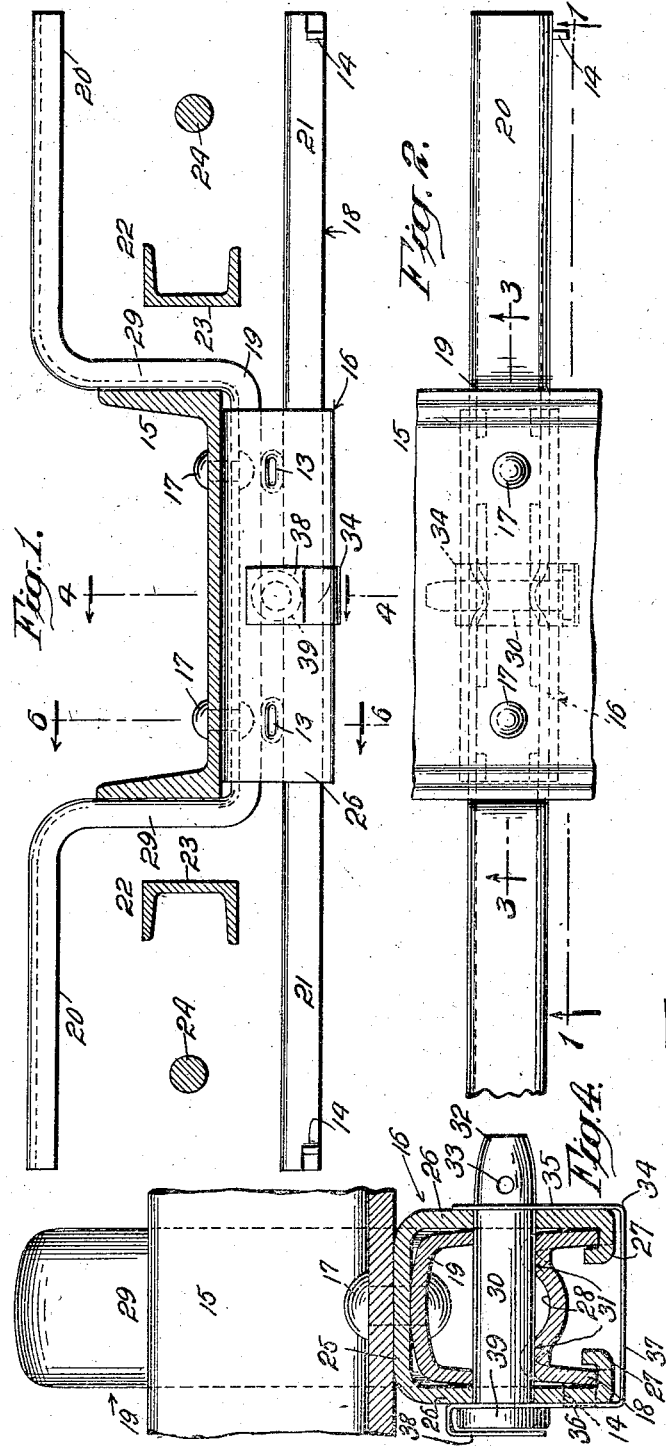

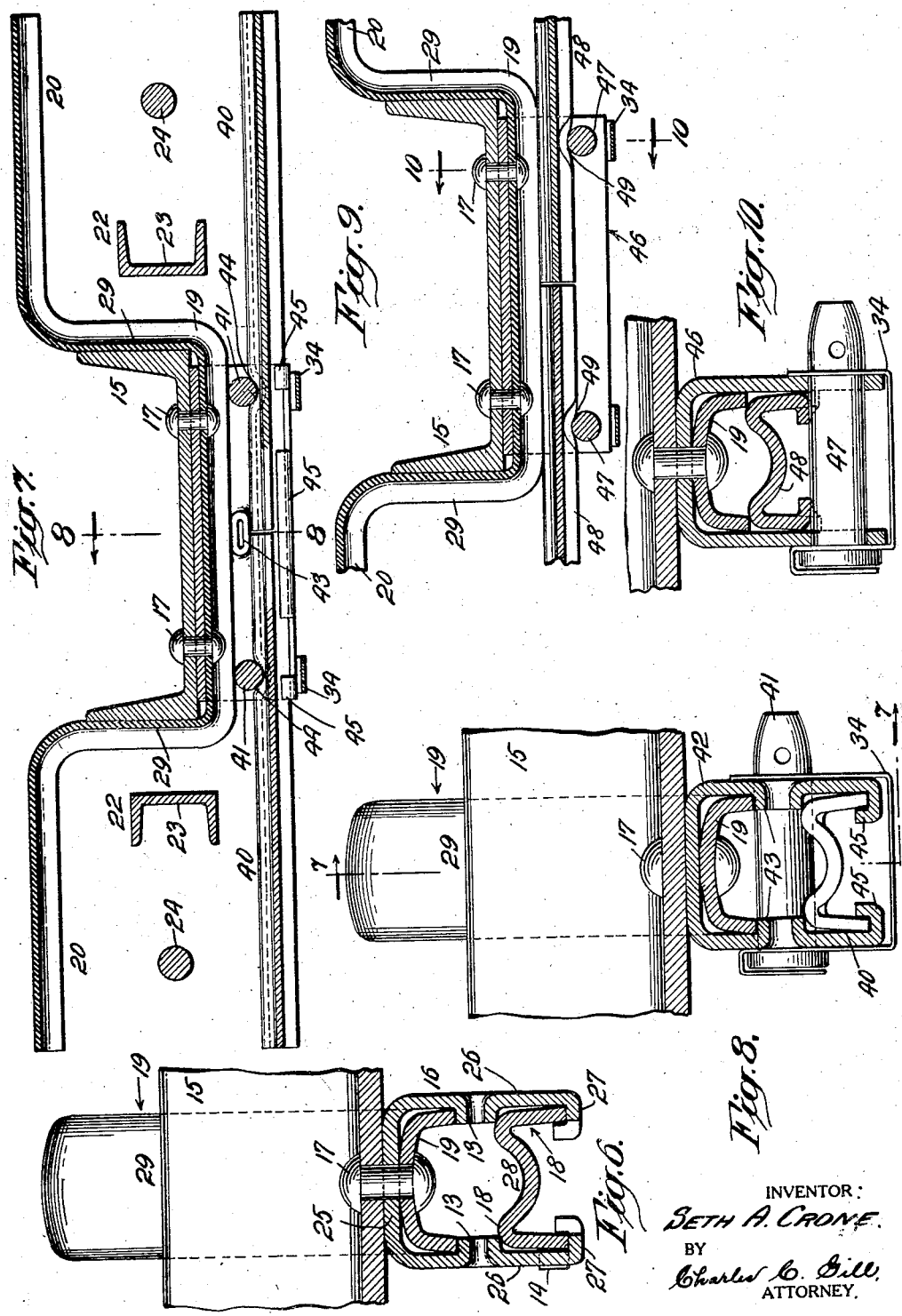

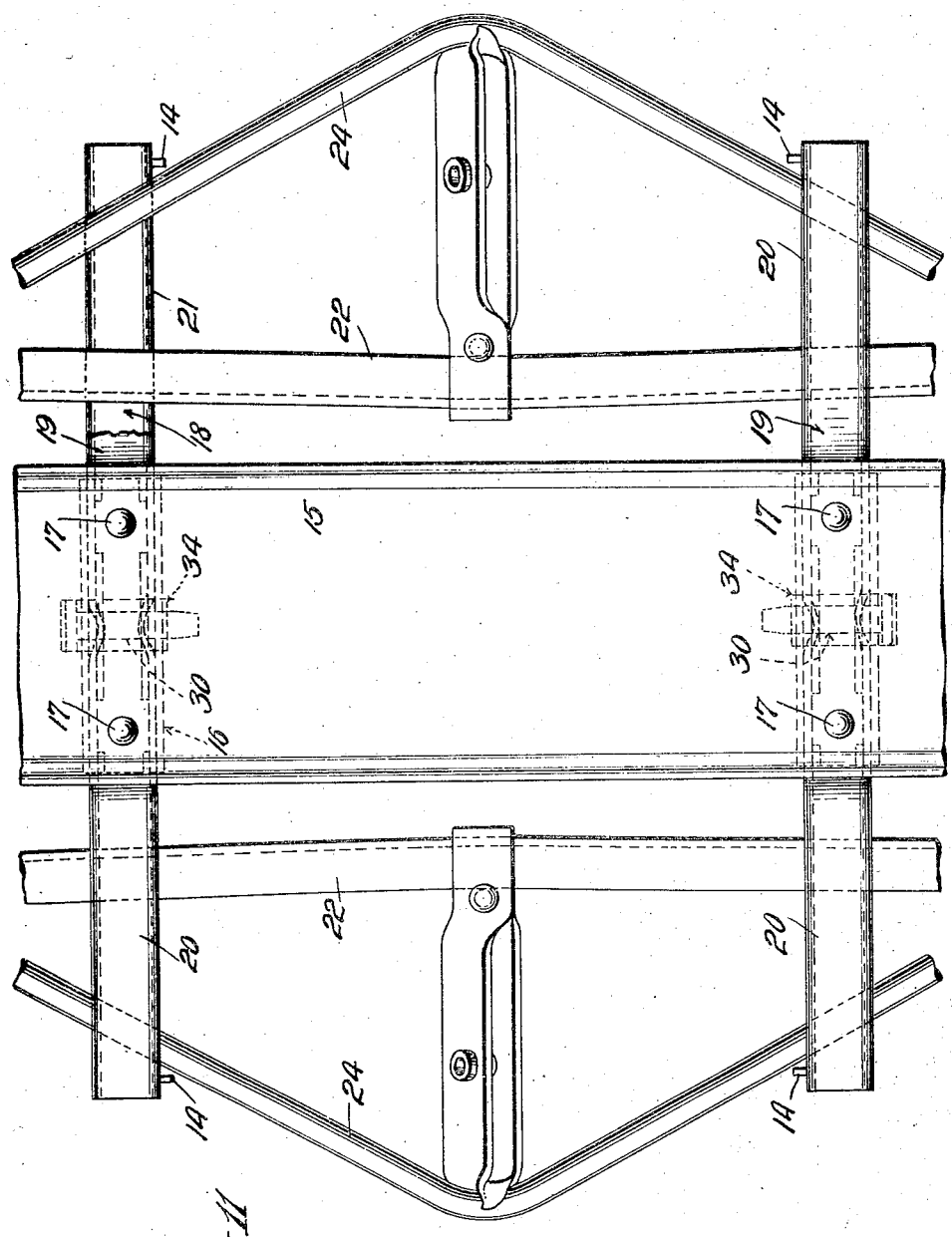

1,566,789

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

RAILWAY BRAKE-BEAM MECHANISM.

Application filed January 13, 1925. Serial No. 2,086.

*To all whom it may concern:*

Be it known that I, SETH A. CRONE, a citizen of the United States, and resident of East Orange, in the county of Essex and State of New Jersey, have invented certain new and useful Improvements in Railway Brake-Beam Mechanisms, of which the following is a specification.

The invention pertains to railway brake beams, and particularly to safety means applied to the spring plank or other transverse portion of a car truck for preventing the brake beams from, under any circumstances, riding upwardly over the wheels of the truck or falling down upon the road-bed, said means comprising at each side of the truck longitudinal safety bars which extend below the end portions of the brake beams and guard bars which extend longitudinally above the end portions of said beams, the guard bars preventing the brake beams from riding unduly upwardly and the safety bars serving to catch the brake beams should they become unhung and fall down.

In carrying out my invention I secure to the bottom of the spring plank, at each side of the truck, a supporting bracket which properly receives portions of the guard bars and portions of the safety or emergency bars, said guard and emergency bars being secured within the supporting bracket by means of a transverse pin or pins of wedge nature driven transversely through holes in the depending side members of the supporting bracket and very firmly binding said bars in rigid relation to each other and to said supporting bracket.

The invention will be fully understood from the detailed description hereinafter presented, reference being had to the accompanying drawings, in which:

Fig. 1 is a longitudinal section through a portion of a car truck equipped with the brake beam features of my invention, the section being on the dotted line 1—1 of Fig. 2;

Fig. 2 is a top view, partly broken away, of the same;

Fig. 3 is a longitudinal section, partly broken away, through the same, taken on the dotted line 3—3 of Fig. 2;

Fig. 4 is a vertical transverse section, partly broken away and on a larger scale, through the same taken on the dotted line 4—4 of Fig. 1;

Fig. 5 is a bottom view of the supporting bracket which I secure to the spring plank and which receives the middle portion of the guard bars and those portions of the emergency safety bars which are below the spring plank;

Fig. 6 is a vertical transverse section, partly broken away, through the spring plank and the features of my invention taken on the dotted line 6—6 of Fig. 1;

Fig. 7 is a vertical longitudinal section through a portion of a car truck equipped with a modified form of my invention, Fig. 7 showing two of the safety bars, while in Fig. 1 the safety bar is in one integral piece, the section of Fig. 7 being on the dotted line 7—7 of Fig. 8;

Fig. 8 is a vertical transverse section, partly broken away, through the same taken on the dotted line 8—8 of Fig. 7;

Fig. 9 is a vertical longitudinal section, partly broken away, through a further modified embodiment of my invention;

Fig. 10 is a vertical transverse section, partly broken away, through the same, taken on the dotted line 10—10 of Fig. 9, and Fig. 11 is a top view, partly broken away, of a car truck showing the guard bars and safety bars of the present invention at each side thereof.

In the drawings 15 designates a portion of the well-known channel form of spring plank constituting a portion of a car truck frame of usual type, 16 a supporting bracket of inverted channel form secured to said spring plank by rivets 17, 18 a safety or emergency bar held at its middle portion within said supporting bracket, and 19 a bar also secured within said supporting bracket and having upper longitudinally extending guard members 20, said members 20 constituting guard bars and the other portions of the bar 19 serving as the connecting and positioning means for the bars 20. The bar 18 may be in one longitudinal piece, as shown in Fig. 1, or in two pieces, as shown in Figs. 7 and 9, and in either event the bar or bars extend longitudinally of the car truck and at their exposed end portions serves as separate emergency or safety bars 21. The bars 20 extend over and the bars 21 below the end portions of the inside hung trussed brake beams 22, each comprising the usual compression member 23 and tension member 24, with the other usual features of trussed brake beams. The bars 20, 21 and their cooperating features are duplicated at opposite sides of the truck, as shown in Fig. 11.

The supporting bracket 16 is of wrought metal and of inverted channel form and has a top 25 and depending side members 26 which are parallel with each other and properly spaced apart to receive the safety bars and middle portion of the bar 19 which affords the guard bar members 20. Referring to Figs. 1 to 6 inclusive, it may be seen that the lower edges of the depending sides 26 of the supporting bracket 16 are flanged inwardly toward each other, as at 27, to provide guiding and supporting channels for the lower edges of the safety bar 18. The supporting bracket 16 is firmly riveted to the spring plank 15 by rivets 17, which also secure the guard bar 19 against the lower surface of the top of said bracket, said rivets extending through holes in the spring plank, in the top of the bracket 16 and in the bar 19 and being headed on both ends. The flanges 27 of the supporting bracket 16 are cut away, as shown in Figs. 3 and 5, below the rivets 17 so as to provide facilities for the introduction of a tool upwardly to the lower ends of the rivets 17, this being to facilitate the riveting operation. The sides 26 of the bracket 16 are preferably embossed inwardly, as at 13 (Figs. 1, 3, 6), to form inwardly extending flanges directly at the upper side edges of the bar 18, these flanges serving as guides in the positioning of the bar 18 and as shoulders keeping said bar down upon the flanges 27. In forming the embossments 13 I first cut holes in the sides 26 and then force the metal around the holes inwardly to create the embossments.

The guard bar 19 is preferably of inverted channel form in cross-section and, as aforesaid, is secured in position by the same rivets 17 that secure the supporting bracket 16 to the spring plank 15. The bar 19 is straight at its middle portion within the supporting bracket 16, and at the ends of said bracket extends upwardly, as at 29, and then longitudinally to form the oppositely extending guard members 20, one of said members extending rearwardly and the other forwardly. The bar 19 may be of any convenient shape in cross-section, but I find that the inverted channel shape for this bar possesses many advantages in the way of securing adequate strength and rigidity without undue weight of metal. As shown in Fig. 1 the portions 29 of the bar 19 are close against the vertical sides of the spring plank 15, whence the members 20 curve upwardly and outwardly and extend on the same horizontal plane above the brake beams 22.

The safety bar 18 is preferably of inverted channel-shape in cross-section, and preferably contains in its top a longitudinal groove or recess 28 which adds strength to the bar without increasing the vertical height thereof. The side members of the bar 18 are guided and held by the flanges 27. The bar 18 is directly below the bar 19, and while supported on the flanges 27 of the supporting bracket 16, are firmly clamped down against said flanges by means of a transverse pin 30 which extends through holes in the depending side members 26 of the supporting bracket 16 and through shallow recesses or depressions 31 formed in the top of the bar 18, as shown in Figs. 3 and 4. The pin 30 is of substantial dimensions, and it has a tapered forward end 32 and is apertured at said end, as at 33, to receive a cotter key, if desired. The pin 30 has a drive-fit between the upper transverse edges of the bar 18, the lower edges of the bar 19 and the edges of the holes in said member 26 through which said pin is driven. The taper on the forward end of the pin 30 is to permit that end of the pin to pass below the lower far edge of the bar 19 and find its way into the hole in the far side of the bracket 16. The pin has a binding action against the bar 18 to clamp it downwardly with great firmness upon the supporting flanges 27, and by reason of the recesses 31 formed in the bar 18, said bar has an interlocking engagement with the pin 30 which secures the bar against endwise movement.

I preferably equip the pin 30 with a lock 34 to prevent the escape of the pin from its position in supporting the bracket 16 should there be no cotter key present at the hole 33, either by reason of inadvertence or accident, and this lock 34 consists simply of a strip of sheet metal bent to form a vertical member 35, a vertical member 36, a lower member 37 connecting said members 35, 36, and a member 38 extending from the upper end of the member 36 and bent downwardly against the outer face of the head 39 of the pin, the members 35, 36 being apertured to permit the pin 30 to pass through them. I have shown the lock 34 in several of my pending applications, and make no separate claim for the same herein.

With reference to the construction shown in Figs. 1 to 6 inclusive, the bar 19, supporting bracket 16 and spring plank 15 are secured together as one integral structure by means of the rivet 17, while the single bar 18 is supported within the bracket 16 and rigidly secured therein by means of a single pin 30. I preferably form the bar 18 of such length that it may extend longitudinally in opposite directions beyond the bracket 16 to a sufficient extent to form the emergency or safety bar members 21. Whenever desired the pin 30 may be withdrawn so as to permit of the sliding of the bar 18 in one direction or the other or its withdrawal entirely as may be convenient for such occasion as may arise with respect to the brake beams 22. The construction described is one of great strength, durability and rigidity, and is of simple nature and capable of being readily applied to car trucks.

The construction shown in Figs. 7 and 8 is much the same as the construction shown in Figs. 1 to 6 inclusive, the main difference between the two constructions being that in Fig. 1 a single bar 18 is used to furnish the safety bar members 21, while in the construction shown in Fig. 7, the safety bars are in two separate pieces or members 40, this feature rendering it necessary to employ two of the wedge pins 41, one for each of said bars. The spring plank 15, bar 19 and supporting bracket, in this instance 42, are all secured together by the rivets 17, as shown in Figs. 7 and 8. I number the supporting bracket as 42, the construction having been changed from that shown in Fig. 1, to the extent of having holes formed through the side members thereof to receive the two pins 41. The meeting or inner end portions of the emergency or safety bars 40 are below elongated embossments or inwardly pressed flanges 43, as shown in Figs. 7 and 8, these embossments of flanges aiding in the positioning of the bars 40 and affording bearings above the adjoining ends of said bars which would prevent down pressure applied on the outer end portions of the bars from turning the inner end portions of said bars upwardly. The bars 40 are transversely recessed at 44 to receive the clamping pins 41, these recesses 44 corresponding exactly with the recess 31 in the bar 18 hereinbefore described. The lower edges of the supporting bracket 42 shown in Figs. 7 and 8 are flanged inwardly, as at 45, to receive the lower edges of the safety bar members 40, as shown in Fig. 8, these flanges 45 corresponding exactly with the flanges 27 shown in Figs. 4 and 5. The purpose of presenting Figs. 7 and 8 is to indicate that the safety bar members may constitute one integral bar, as shown in Fig. 1, or be in two separate pieces, each independently secured in position, as shown in Fig. 7.

In the modification shown in Figs. 9 and 10 I make no change in the spring plank 15, bar 19 or rivets 17, but slightly modify the details of the supporting bracket 46 to permit the locking pins 47 to pass below the safety bar members 48 instead of above the same. In the construction shown in Figs. 9 and 10 the safety bar members 48 are straight and their upper edges at the inner ends thereof are against the lower edges of the bar 19 and their lower edges within the supporting bracket 46 are recessed, as at 49, and engaged by the wedge pins 47 to bind the inner end portions of the bars 48 upwardly against the bar 19. When the pins 47 are below the safety bar members and wedge said members upwardly, it is not necessary that the supporting bracket be provided with flanges such as those numbered 45 in Figs. 7 and 8. The construction shown in Figs. 9 and 10 will be readily understood from the detailed descriptions hereinbefore presented. The construction shown in Figs. 7, 8, 9 and 10 will preferably be provided with pin locks 34 of the character hereinbefore described.

When the emergency safety bar for each side of the truck is in one integral piece, as shown in Fig. 1, I will preferably provide each bar with means for preventing it from sliding out from the supporting bracket 16 in the event that the securing pin 18 should be inadvertently omitted or should become lost from the bracket, and in carrying out this feature of my construction I will slit a tongue in the side of each end of the channel bar 18 and, after the bar has been inserted into the bracket 16, bend the tongues laterally to form projecting fingers or stops 14 adapted to engage the end of the bracket, should the bar be jarred to slide endwise, and retain said bar against escaping wholly from the bracket. The emergency bar 18 is of rolled metal, and hence the fingers 14 may be bent outwardly therefrom after the bar has been introduced into the bracket 16, and may also be bent back into the body of the bar at any time it might become necessary to remove the bar from the bracket.

In each of the constructions described the spring plank 15, bars 19 and supporting brackets are, at each side of the car truck, all secured together by means of the rivets 17, and in each of said constructions safety bar members are secured, at opposite sides of the truck, by a pin or pins extending through the sides of the supporting brackets and engaging said members with binding effect.

The spring plank 15 is one of many known forms of spring planks differing in details from one another but performing like duties. My invention is not limited to the details of any special spring plank, and therefore I employ the designation "spring plank" in this application in a generic sense.

What I claim as my invention and desire to secure by Letters Patent, is:

1. In a car-truck having a spring plank and inside hung brake-beams, inverted channel supporting brackets below the spring plank at opposite sides of the truck, a longitudinal bar extending through each of said brackets and thence extending upwardly and longitudinally in opposite directions to form upper guard members extending above the end portions of the brake-beams, means rigidly securing said bars and brackets to the spring plank, emergency safety bar members removably secured within said supporting brackets and thence extending longitudinally in opposite directions below the end portions of the brake-beams.

2. In a car-truck having a spring plank and inside hung brake-beams, inverted channel supporting brackets below the spring plank at opposite sides of the truck, a longitudinal bar extending through each of said brackets and thence extending upwardly and longitudinally in opposite directions to form upper guard members extending above the end portions of the brake-beams, rivets extending through said spring plank, the top of said supporting brackets and said bars for rigidly securing said parts together, emergency safety bar members removably secured within said supporting brackets and thence extending longitudinally in opposite directions below the end portions of the brake-beams.

3. In a car-truck having a spring plank and inside hung brake-beams, inverted channel supporting brackets below the spring plank at opposite sides of the truck, a longitudinal bar extending through each of said brackets and thence extending upwardly and longitudinally in opposite directions to form upper guard members extending above the end portions of the brake-beams, means rigidly securing said bars and brackets to the spring plank, emergency safety bar members removably secured within said supporting brackets and thence extending longitudinally in opposite directions below the end portions of the brake-beams, the means securing said safety bar members being transverse pins extending through holes in the sides of said brackets and engaging said members with wedging effect.

4. In a car-truck having a spring plank and inside hung brake-beams, inverted channel supporting brackets below the spring plank at opposite sides of the truck, a longitudinal bar extending through each of said brackets and thence extending upwardly and longitudinally in opposite directions to form upper guard members extending above the end portions of the brake-beams, means rigidly securing said bars and brackets to the spring plank, emergency safety bar members removably secured within said supporting brackets and thence extending longitudinally in opposite directions below the end portions of the brake-beams, the means securing said safety bar members being transverse pins extending through holes in the sides of said brackets and engaging said members with wedging effect, said members being recessed at the points of their engagement with said pins for interlocking therewith.

5. In a car-truck having a spring plank and inside hung brake-beams, inverted channel supporting brackets below the spring plank at opposite sides of the truck, a longitudinal bar extending through each of said brackets and thence extending upwardly and longitudinally in opposite directions to form upper guard members extending above the end portions of the brake-beams, means rigidly securing said bars and brackets to the spring plank, emergency safety bar members removably secured within said supporting brackets and thence extending longitudinally in opposite directions below the end portions of the brake-beams, said bars affording the upper guard members and said safety bar members being of inverted channel shape in cross-section.

6. In a car-truck having a spring plank and inside hung brake-beams, inverted channel supporting brackets below the spring plank at opposite sides of the truck, a longitudinal bar extending through each of said brackets and thence extending upwardly and longitudinally in opposite directions to form upper guard members extending above the end portions of the brake-beams, means rigidly securing said bars and brackets to the spring plank, emergency safety bar members removably secured within said supporting brackets and thence extending longitudinally in opposite directions below the end portions of the brake-beams, the means securing said safety bar members being transverse pins extending through holes in the sides of said brackets and engaging said members with wedging effect, and said pins each having a head on one end and being tapered on its other end adapting the pins for a drive fit and to find and enter the hole in the far side of the bracket.

7. In a car-truck having a spring plank and inside hung brake-beams, inverted channel supporting brackets below the spring plank at opposite sides of the truck having the lower edges of their depending sides turned inwardly to form supporting flanges, a longitudinal bar extending through each of said brackets and thence extending upwardly and longitudinally in opposite directions to form upper guard members extending above the end portions of the brake beams, means rigidly securing said bars and brackets to the spring plank, emergency safety bar members removably secured within said supporting brackets and thence extending longitudinally in opposite directions below the end portions of the brake-beams, said safety bar members being seated on said supporting flanges, and the means securing said safety bar members being transverse pins extending through holes in the sides of said brackets and binding said members against said flanges.

8. In a car truck having a spring pla and inside hung brake-beams, emergency or safety bars at opposite sides of the truck extending below the end portions of the brake-beams, and means for removably supporting said bars from the spring plank, comprising supporting brackets secured to the spring plank and having depending longitudinal side members adapted to receive said bars between them, said side members having transverse aligned holes formed therein, and transverse pins driven through said holes and against transverse surfaces of said bars with binding effect, said bars at their opposite ends having tongues slit therein and bent outwardly to act as stops against the ends of said brackets in the event that the pins should become omitted or lost, thereby preventing the accidental escape of the safety bars from the brackets.

9. In a car-truck having a spring plank and inside hung brake-beams, emergency or safety bars at the opposite sides of the truck extending below the end portions of said brake-beams, and means for removably supporting said bars from the spring plank comprising supporting brackets secured to the spring plank and having depending longitudinal side members adapted to receive said bars between them, said side members being flanged inwardly at their lower edges to afford seats for said bars and having inwardly embossed flanges to engage the upper edges of said bars, and said supporting brackets also having means for firmly securing said bars therein.

Signed at New York city, in the county of New York and State of New York, this 12th day of January, A. D. 1925.

SETH A. CRONE.